(12) United States Patent
Sebastian et al.

(10) Patent No.: US 6,617,764 B2
(45) Date of Patent: Sep. 9, 2003

(54) HIGH TEMPERATURE PIEZOELECTRIC SENSOR

(75) Inventors: James R. Sebastian, Kettering, OH (US); David A. Stubbs, Waynesville, OH (US); Rollie E. Dutton, Beavercreek, OH (US)

(73) Assignee: University of Dayton, Dayton, OH (US)

( * ) Notice: Subject to any disclaimer, the term of this patent is extended or adjusted under 35 U.S.C. 154(b) by 0 days.

(21) Appl. No.: 09/951,260

(22) Filed: Sep. 12, 2001

(65) Prior Publication Data

US 2002/0043898 A1 Apr. 18, 2002

Related U.S. Application Data

(60) Provisional application No. 60/232,484, filed on Sep. 13, 2000.

(51) Int. Cl.$^7$ ............................... H01L 41/08
(52) U.S. Cl. ....................... 310/329; 310/319
(58) Field of Search ................ 310/329, 338, 310/339, 311, 360, 328

(56) References Cited

U.S. PATENT DOCUMENTS

| | | | | |
|---|---|---|---|---|
| 2,408,816 A | * | 10/1946 | Shapiro | ............... 310/338 |
| 3,714,476 A | | 1/1973 | Epstein | |
| 3,801,838 A | * | 4/1974 | Kistler | ............... 310/338 |
| 3,948,089 A | | 4/1976 | Shaw et al. | |
| 4,480,488 A | * | 11/1984 | Read et al. | ............... 73/862.68 |
| 4,512,431 A | * | 4/1985 | Bloomfield | ............... 177/210 R |
| 4,604,544 A | * | 8/1986 | Konomi et al. | ............... 310/338 |
| 4,816,713 A | * | 3/1989 | Change, Jr. | ............... 310/319 |
| 5,371,472 A | | 12/1994 | Wohlstreicher | |
| 5,537,883 A | | 7/1996 | Okauchi et al. | |
| 5,682,000 A | | 10/1997 | Okada | |
| 5,739,626 A | | 4/1998 | Kojima et al. | |
| 5,747,671 A | * | 5/1998 | Hirota et al. | ............... 73/61.75 |
| 5,777,231 A | | 7/1998 | Patel et al. | |
| 5,777,239 A | | 7/1998 | Fuglewicz | |
| 5,852,245 A | | 12/1998 | Wesling et al. | |
| 5,886,456 A | * | 3/1999 | Stubbs et al. | ............... 310/336 |
| 6,271,621 B1 | | 8/2001 | Ito et al. | |
| 6,396,200 B2 | * | 5/2002 | Misu et al. | ............... 310/348 |

OTHER PUBLICATIONS

L. Zheng et al: "Aluminum Nitride Thin Film Sensor for Force, Acceleration and Acoustic Emission Sensing" Journal of Vacuum Science and Technology: Part A, vol. 11, No. 5, Sep. 1993–Oct. 1993, pp. 2437–2446.

* cited by examiner

*Primary Examiner*—Mark Budd
(74) *Attorney, Agent, or Firm*—Killworth, Gottman, Hagan & Schaeff LLP

(57) ABSTRACT

The present invention provides a sensor that can be operated at high temperatures. The sensor comprises a first electrode, a second electrode, and an aluminum nitride film which lies between the first and second electrode. The sensor can be used to measure pressure, acceleration, or force at high temperatures.

16 Claims, 5 Drawing Sheets

HIGH TEMPERATURE PIEZOELECTRIC SENSOR

CROSS-REFERENCE TO RELATED APPLICATIONS

This application claims the benefit of U.S. Provisional Application Ser. No. 60/232,484, filed Sep. 13, 2000.

FEDERAL RESEARCH STATEMENT

This invention was made with government support under Contract No. F33615-98-C-5217 awarded by the Department of the Air Force. The Government has certain rights in this invention. The invention described herein may be manufactured and used by or for the Government of the United States for all governmental purposes without the payment of any royalty.

BACKGROUND OF THE INVENTION

The present invention relates to a high temperature piezoelectric sensor, and more particularly to a high temperature piezoelectric sensor utilizing aluminum nitride films which can be used to sense force, acceleration and pressure.

In order to generate a useful output signal, some sensors rely on the piezoelectric effect. When piezoelectric elements are strained by an external force, displaced electrical charge accumulates on opposing surfaces. This electrical charge can be used to measure the amount of pressure, force, and acceleration of an object.

Piezoelectric sensors have been developed using materials such as quartz. However, the piezoelectric materials have not been suitable for use at high temperatures. The maximum temperature for such materials is their Curie point, or (for artificially poled materials) the poling temperature. Existing high temperature piezoelectric sensors based on quartz are useful up to only around 700° C. Thus, there is a need in the art for a piezoelectric sensor that is suitable for use at high temperatures.

Aluminum nitride has also been used in transducers. See, for example, U.S. Pat. No. 5,886,456, which is hereby incorporated by reference, and which utilizes aluminum nitride in an ultrasonic transducer which generates and detects ultrasonic sounds. However, heretofore, aluminum nitride has not been utilized in sensors for use at high temperatures to sense force, acceleration or pressure.

Accordingly, there is a need for a sensor with an extended temperature range that can be used to measure force, acceleration or pressure.

BRIEF SUMMARY OF THE INVENTION

This need is met by the present invention by providing a sensor utilizing piezoelectric aluminum nitride films that can be operated at high temperatures without damage. The sensor can be operated at temperatures exceeding 1100° C. The sensor can be used to measure pressure in processes such as die-casting, extrusion, and engine monitoring. The sensor can also be used to measure force or acceleration. Accordingly, it is an object of the present invention to provide a sensor comprising a first electrode, a second electrode, and an aluminum nitride film which lies between the first and second electrode. The sensor can be used to measure pressure, acceleration, or force at high temperatures.

According to one embodiment of the present invention provided is a high temperature piezoelectric sensor device comprising first and second electrodes and a piezoelectric film between the first and second electrodes, wherein the piezoelectric sensor is operable up to a temperature of about 1200° C. The piezoelectric film is preferably aluminum nitride. The first electrode is a substrate selected from the group consisting of carbide, titanium, silicon carbide, carbon, similar metals, and semiconductive ceramics. The sensor is adapted to provide a measurement selected from the group consisting of force, pressure, and acceleration.

According to another embodiment of the present invention provided is a high temperature piezoelectric sensor suitable for use in a control circuit comprising a sensor, a charge amplifier that is electronically coupled to the sensor, and a microelectronic device that is electronically coupled to the charge amplifier. The sensor comprises a first electrode comprising a first side and a second side, a piezoelectric film comprising a first side and a second side. The first side is supported by the second side of the first electrode. The second electrode comprises a first side and a second side, wherein the first side of the second electrode supports the second side of the film. The control circuit provides a measurement selected from the groups consisting of pressure, force, and acceleration.

These and other features and objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION

Figure 1:
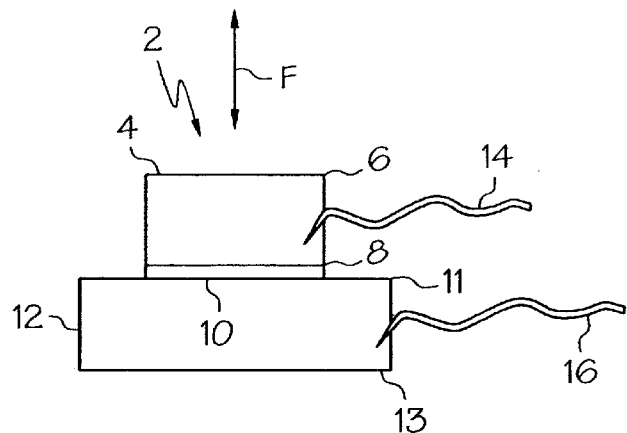
FIG. 1 is a diagrammatic cross-section view of a piezoelectric sensor according to the present invention.

The present invention is best described by referring to the figures. Referring initially to FIG. 1, a high temperature piezoelectric sensor 2 is provided. The sensor 2 includes a first electrode 4, a piezoelectric film 10, and a second electrode 12. The first electrode 4 comprises a first side 6 and a second side 8. The second electrode 12 comprises a first side 11 and a second side 13. The piezoelectric film 10 lies between the first side 11 of the second electrode 12 and the second side 8 of the first electrode 4.

The first electrode 4 may be a single material or it may be composed of a nonconductive material with a conductive coating. The piezoelectric film 10 is the active element of the sensor 2. The piezoelectric film 10 is made of ceramic, and has a layer thickness from about 0.02 mm to about 0.2 mm. Preferably, the piezoelectric film 10 is aluminum nitride (AlN). Other crystalline or polycrystalline ceramics such as, for example and not limited to, boron nitride (BN) may be used for the second electrode 12. In one embodiment using an aluminum nitride as the piezoelectric film 10, the sensor 2 can operate and withstand pressures on the order of 100,000 psi and temperatures of about 1200° C., and remain intact until substrate degradation occurs near 1400° C. with no known aluminum nitride Curie point.

In forming the sensor 2, the piezoelectric film 10 is deposited onto a side surface of one of the electrodes 4 or 12 through a chemical vapor deposition process. The exposed side of the film 10 is polished and the remaining electrode 4 or 12 is then applied directly thereon, or formed by a conductive part contacting the surface of the film 10 to complete the sensor 2.

For operation of the sensor 2, a force is applied perpendicular to the flat face of the film 10. The force may be applied directly by a solid member (direct force sensor, indirect pressure sensor); by a pressurized gas or liquid (direct pressure sensor); by the inertial reaction of a mass (accelerometer); or by the transmission of stress waves into the sensing film (ultrasonic transducer in receiver mode, microphone, acoustic emission sensor). The application of force to the film 10 will result in the appearance of an electrical charge at the boundaries of the film 10. Charges then appear at the first electrode 4 and second electrode 12. The charges are then conducted down a first wire 14 and a second wire 16. In FIG. 1, the first wire 14 is coupled to the first electrode 4 while the second wire 16 is coupled to the second electrode 12.

Figure 2:
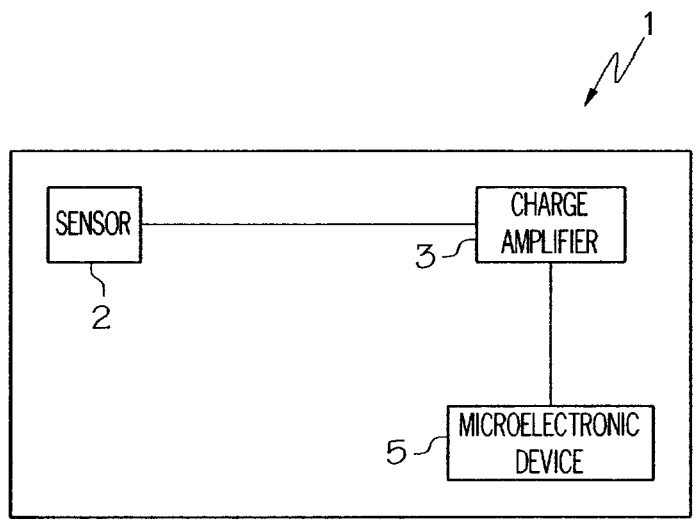
FIG. 2 is a diagrammatic view of a control circuit comprising a piezoelectric sensor according to the present invention.
Figure 3:
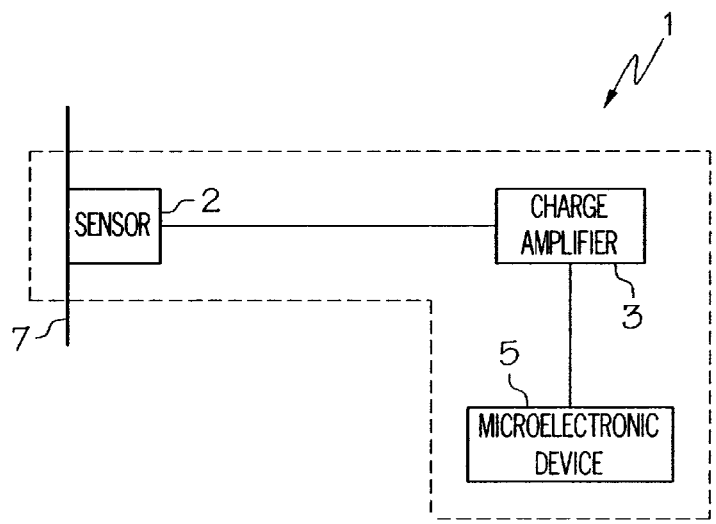
FIG. 3 is a diagrammatic view of a control circuit comprising a piezoelectric sensor according to the present invention and utilized to monitor an engine.

FIG. 2 illustrates a control circuit 1 embodiment of the invention using the high temperature piezoelectric sensor 2. The control circuit 1 comprises the sensor 2 as described above electrically coupled to a charge amplifier 3 which is electrically coupled to a microelectronic device 5. In using the control circuit 1, the voltage potential across the wires 14 and 16 of the sensor 2 is amplified by the charge amplifier 3 into a voltage signal useable by the microelectronic device 5. The voltage signal is then converted by the microelectronic device to a force, pressure, or acceleration reading due to the direct proportionality between the voltage and the force, pressure, or acceleration. As illustrated by FIG. 3, the sensor 2 of the control circuit 1 may be coupled to or form part of a structure 7, such as a combustion chamber wall of a heat engine (i.e., Otto, diesel, Brayton, Stirling and Rankine cycles), part of a fuselage, and the like.

Figure 4:
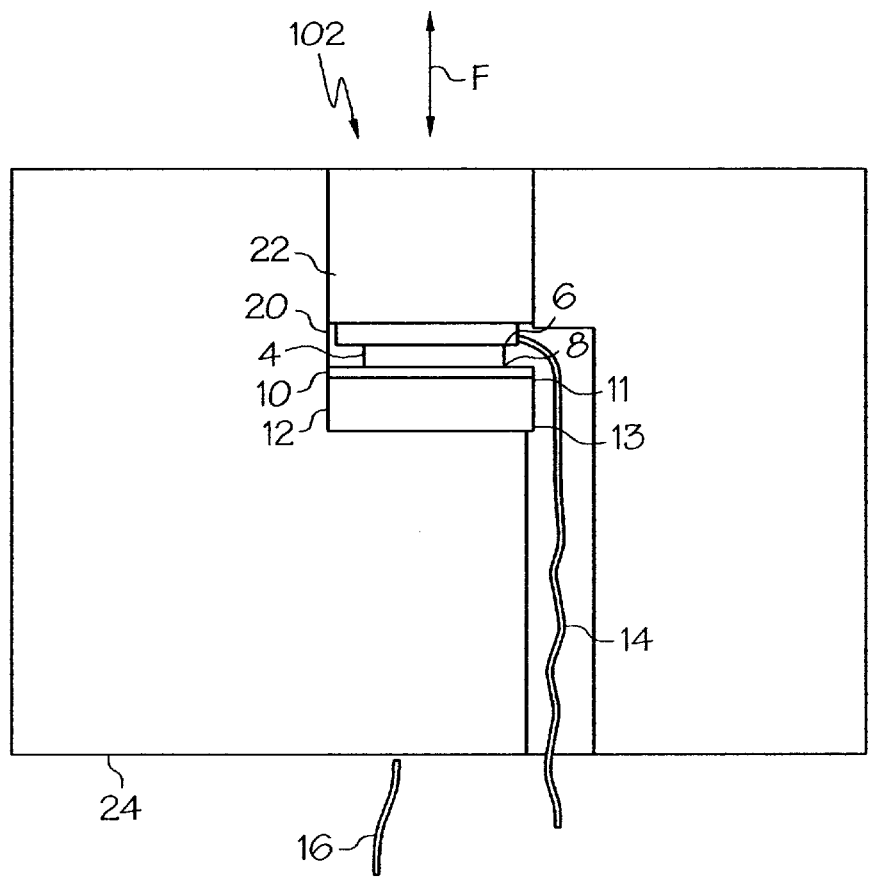
FIG. 4 is a diagrammatic cross-section view of a piezoelectric sensor according to the present invention adapted to measure force.

FIG. 4 illustrates an embodiment according to the present invention adapted to measure pressure. For pressure measurement it is required that the pressure being measured be applied to an area, which can convert it to a force that compresses the piezoelectric film. The pressure sensor 102 is shown in this exemplary embodiment coupled to a pressure body 24, such as for example, a portion of a forging die. The second electrode 12 is either coupled or formed as part of the pressure body 24, which is grounded by the second wire 16. An insulative plate 20 is coupled to the first side 6 of the first electrode 4. The plate 20 is preferably a ceramic material for improved electrical insulation at elevated temperature and mechanical stiffness, however, for other embodiments, other insulating materials may be used.

On the opposed side of the plate 20 from the first electrode 4 rests a plug 22, which is preferably steel. The plug 22 on the opposed side from the plate 20, forms part of the engagable surface of the pressure body 24. On the remaining sides, the plug 22 is surrounded by the pressure body 24 and movably in a cavity formed thereof. The first wire 14 extends from the first electrode through a drilled hole 21 to connect the piezoelectric sensor 2 to a connector that hold and isolates the insulated first wire 14. The components are aligned such that the force being measured is transmitted to the film 10 as a compressive load. Tensile forces may be sensed by applying a compressive mean load to the sensor such that a tensile load will be sensed as a lessening of the compressive stress applied to the film 10.

Figure 5:
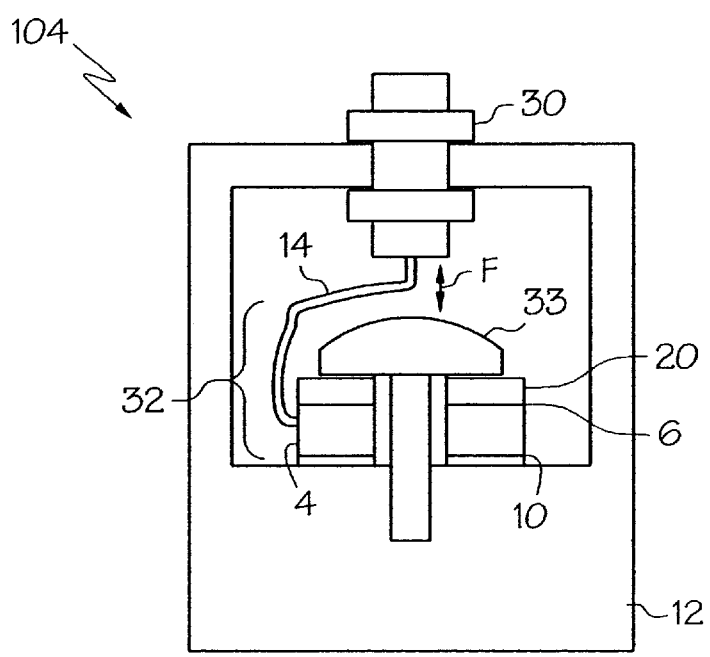
FIG. 5 is a diagrammatic cross-section view of a piezoelectric sensor according to the present invention adapted to measure acceleration.

FIG. 5 illustrates an embodiment according to the present invention adapted to measure acceleration. For acceleration, a seismic mass 32 is used to convert the acceleration to a force. Additionally, the use of a compressive preload 33 is especially important for accelerometer applications, where accelerations are generally in both the positive and negative directions. The first electrode 6 of the accelerometer 104 is connected to a connector 30 by the first wire 14 which acts as a signal wire. The connector 30 is preferably a coaxial connector that includes, as known, a ground portion insulated from a signal portion. The preferred insulation is ceramic.

An insulative plate 20 is attached to the first side 6 of the first electrode 4 and coupled to the seismic mass 32. In one embodiment, the plate 20 is a ceramic washer and the preload mechanism 33 is a stainless steel bolt, however, for other embodiments, other similarly suitable materials may be used. The preload mechanism 33 is vertically inserted through first electrode 4 and the piezoelectric film 10, and loaded by coupling to the second electrode 12, here configured as a protective housing, which can be mounted to any structural member.

Figure 6:
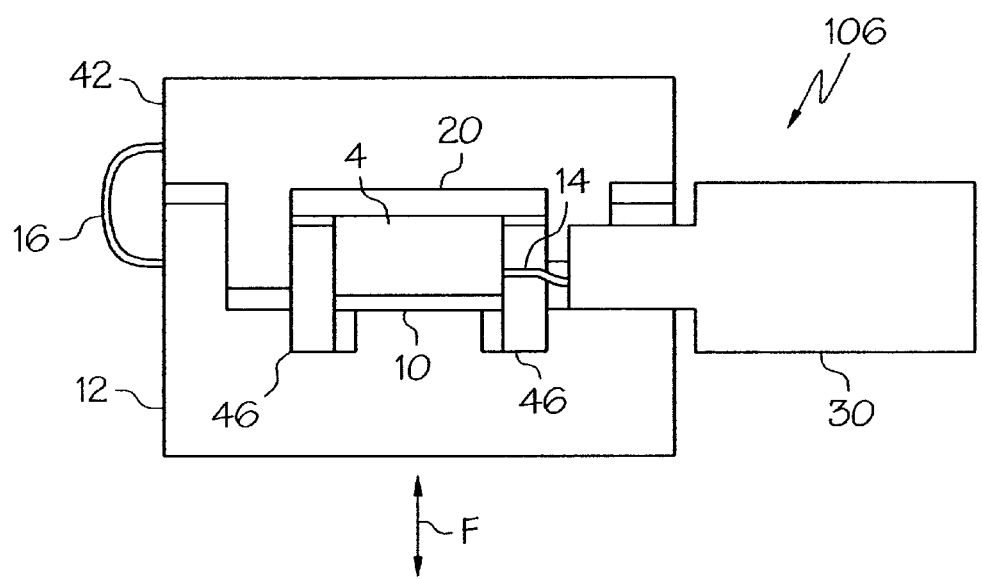
FIG. 6 is a diagrammatic cross-section view of a piezoelectric sensor according to the present invention adapted to measure forging pressure.

FIG. 6 illustrates an embodiment according to the present invention adapted to measure force. The force sensor 106 is connected to the signal portion of the connector 30 by the first wire 14 which is coupled to the first electrode 4. Since the first wire 14 is a signal wire it is preferably ceramic coated for insulation. The second electrode 12 acts as a pressure plate that acts against a top pressure plate 42. The second electrode 12 is coupled to the insulator 46 that protrude substantially perpendicular from the second electrode 12. The insulator 46 is situated so that it rests perpendicularly against the first electrode 4 and the piezoelectric film 10. The top pressure plate 42 is coupled to the top portion of the insulating plate 20 such that it expands over the insulating plate 20. This expansion allows the top pressure plate 42 to be also coupled to the insulator 46. As illustrated, a portion 42a of the pressure plate 42 is slidably mounted between the insulator 46 and second electrode 12. Thus, the top pressure plate 42 and the second electrode 12 enclose therebetween insulators 20 and 46, first electrode 4, and piezoelectric film 10. The second wire 16 is a jumper wire connecting the second electrode 12 to the top pressure plate 42.

Figure 7:
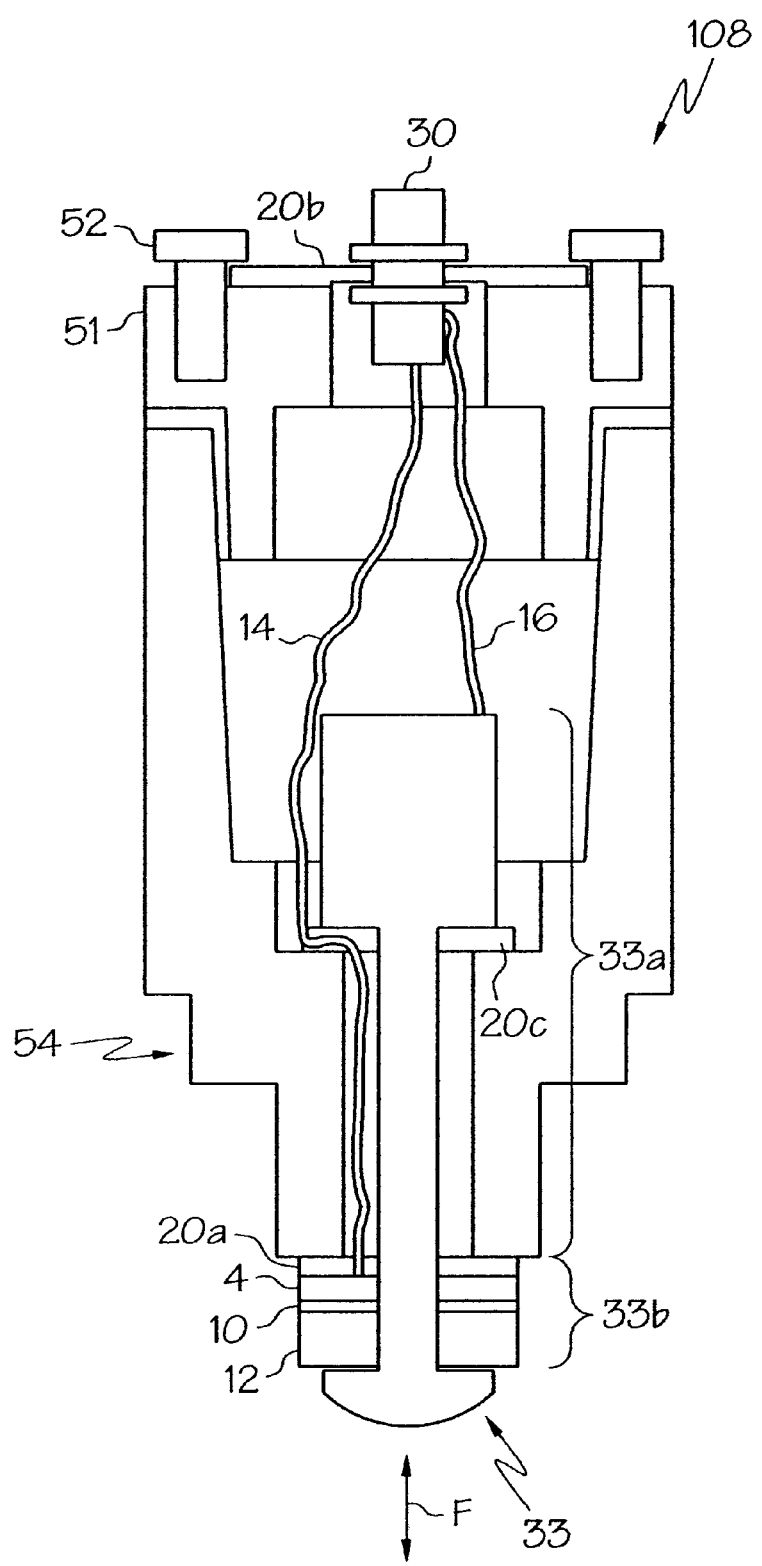
FIG. 7 is a diagrammatic cross-section view of a piezoelectric sensor according to the present invention adapted to measure isolated ground pressure.

FIG. 7 illustrates an embodiment according to the present invention adapted to measure isolated ground pressure. In this exemplary embodiment, the pressure sensor 108 comprises a housing 51 surrounding and isolating various sensor components. The housing 51 is preferably cylindrical in shape, and on an exterior surface 54 may include threads such that it may be threaded into a conventional pressure port. In particular, the housing 51 at a first end is coupled to a top portion of a first insulative plate 20a, and at the opposed end, to a second insulative plate 20b by fastening device 52, such as a plate retaining screw.

The pressure sensor 108 further comprises a probe 33 having an interior portion 33a and an exterior portion 33b, which is preferably steel. The housing 51 encloses the interior probe portion 33a, wires 14, 16, and a third insulative plate 20c. In this exemplary embodiment, the insulative plates 20a, 20b, 20c are ceramic washers. The housing 51 is preferably ceramic coated on the inside to act as an insulative shield for the first wire 14, second wire 16, and interior probe portion 33a. As illustrated, the probe 33 from the exterior probe portion 33b extends through the second electrode 12, the piezoelectric film 10, the first electrode 4, and the first and third insulative plates 20a and 20c, respectively. The interior probe portion 33a is coupled to the ground portion of connector 30 by the second wire 16, wherein voltage is sensed at the first electrode 4 via wire 14 couple to the signal portion of connector 30.

Potential uses for the sensor of the present invention include monitoring deformation in hot isostatic pressing (HIP), use as part of a high temperature load cell, as a room temperature, high frequency ultrasonic NDE transducer, detection of inclusions in molten metals, and as a direct charge mode force sensor. The sensor may also be used to measure force, acceleration or pressure in processes such as die casting, extrusion, and engine monitoring.

The sensor can replace existing sensors in high temperature applications that require active cooling. This includes the monitoring of pressures in ballistics, internal combustion engines, high temperature fluids, injection molding, extrusion and die casting. The sensor may also be used for force monitoring and acceleration monitoring at high temperatures.

EXAMPLE 1

A sensor utilizing an aluminum nitride film was fabricated and placed in an MTS load frame which could apply a compressive load. At room temperature, using a commercial charge amplifier, quasistatic load measurement capabilities were demonstrated. The temperature was increased to above 300° C., and an unexplained effect forced the replacement of the commercial charge amplifier with a signal conditioning circuit consisting of a high impedance voltage follower, a high pass filter, and a gain stage. With these electronics, vibrations at frequencies ranging from 10 Hz to above 1000 Hz were observed. Shock signals were observable on an oscilloscope connected directly to the sensor with no signal conditioning. With slight modifications, the sensor operated above 600° C. The sensitivity of the sensor is within one order of magnitude of commercially available devices at room temperature and at 100° C.

The aluminum nitride films used in the piezoelectric sensors of the present invention may function as replacements for currently used piezoelectric materials. They can be used with inexpensive, commercially available signal conditioning equipment. For quasistatic or low frequency use, special care will have to be taken with the electrical insulation of the high impedance portion of the circuit.

EXAMPLE 2

Figure 8:
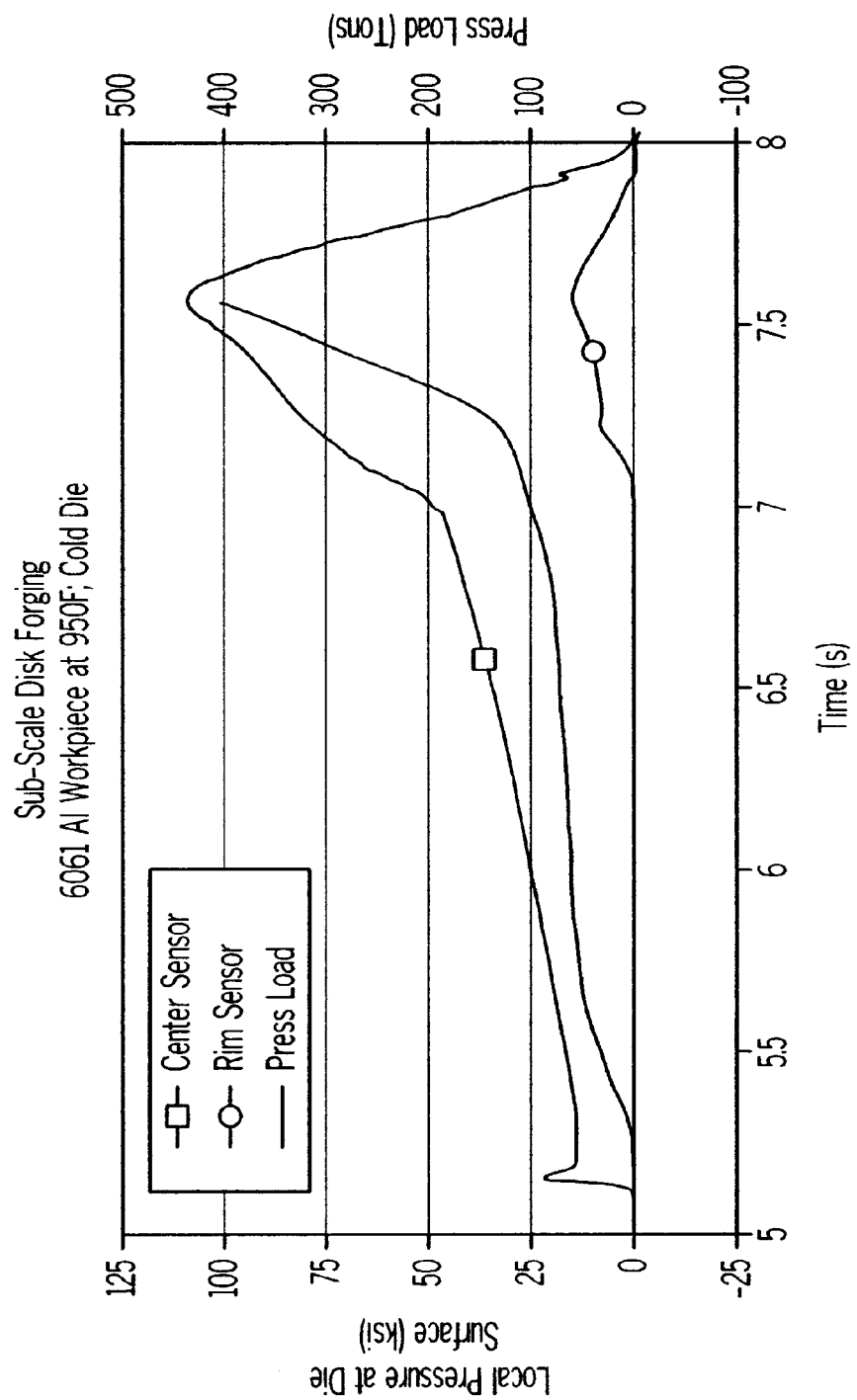
FIG. 8 is a graph showing signal response over time during an exemplary forging run employing a pair of piezoelectric sensors according to the present invention to measure center and edge pressure realized by a forged item.

The lower die of a forging press was instrumented with two sensors in the manner of FIG. 4. A cylindrical workpiece of 6061 aluminum at 950° C. was placed between the upper and lower dies. The dies were closed together, forging the workpiece into a flat ring with a center web. The signals received from the sensors in the die during the forging run are illustrated along with the press load in the Table provided as FIG. 8. FIG. 8 shows the initial force of the workpiece at the center sensor as the upper die touched the workpiece at approximately 5.2 seconds. Shortly thereafter, hydraulic pressure was applied by the press and the workpiece flattened outward until about 7 seconds, when it was restrained by the outer wall of the die. At this time, the workpiece touched the second sensor, which read a force, and the force registered at the center sensor increased further in order to continue to fill the die, as confirmed by the corresponding increase in press load. At the end of the stroke of the press, approximately 7.6 seconds, both sensors recorded a maximum force. At approximately 7.9 seconds, both sensors recorded a load transient as the weight of the upper die began to be lifted from the workpiece.

The sensors indicated when material reached them. The sensors also indicated increases and decreases in the workpiece pressure. The outer sensor showed significantly less pressure, it is believed that this is due to the die not filling in the corners of the ring. This indicates significantly less pressure. The sensors were not damaged in the test.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A high temperature piezoelectric sensor device comprising first and second electrodes;

a first insulator having first and second surfaces;

a pressure component engaging at least said first surface of said first insulator, wherein said second surface of said first insulator engages said first electrode, and said pressure component is coupled to said second electrode;

a second insulator extending substantially perpendicular from said second electrode; and a piezoelectric film separating said first and said second electrode, wherein said piezoelectric film is deposited using chemical vapor deposition, wherein said piezoelectric sensor is operable up to a temperature of about 1200° C.

2. A device as claimed in claim 1 wherein said piezoelectric film is aluminum nitride.

3. A device as claimed in claim 1 wherein said pressure component is a pressure body having a plug engaging said first surface of said first insulator, wherein said plug is accommodated in a cavity of said pressure body.

4. A device as claimed in claim 1 wherein said pressure component expands over said first insulator and includes a pressure plate portion that is slidably mounted between said second insulator and said second electrode.

5. A device as claimed in claim 1 wherein said first electrode, is a substrate selected from the group consisting of carbide and titanium.

6. A device as claimed in claim 1 wherein said sensor is adapted to provide a measurement selected from the group consisting of force, pressure and acceleration.

7. A device as claimed in claim 1 wherein said second electrode is a forging die body.

8. A device as claimed in claim 1 wherein said pressure component is a pressure plate.

9. A device as claimed in claim 1 wherein said pressure component is a mass member, wherein said first insulator, said first electrode and said piezoelectric film form a cavity, and said mass member ii coupled to said second electrode through said cavity.

10. A device as claimed in claim 9 wherein said second electrode forms a protective housing for said first insulator, said first electrode, said piezoelectric film and said mass member.

11. A device as claimed in claim 10 wherein said second insulator is a connector insulatively couple to second electrode and electrically couple to said first electrode.

12. A high temperature piezoelectric sensor device comprising:
   first and second electrodes;
   a piezoelectric film starting said first and second electrodes
   first and second insulator plates, said first insulator being coupled to said first electrode,
   a housing coupled between said first and second insulator plates; and
   a mass member having exterior and interior portions, said housing enclosing said interior portion of said mass member and said second insulator plate member,
   wherein said first and second insulator plates, said first and second electrodes, said piezoelectric film, and said housing define a cavity, and said exterior portion of said mass member is coupled to said second electrode through said cavity.

13. A device as claimed in claim 12 further comprising a connector insulatively coupled to said housing, wherein said mass member is grounded to said connector and said first electrode is electrically couple to said connector through said first and second insulator plates.

14. A high temperature piezoelectric sensor suitable for use in a control circuit comprising:
   a sensor;
   a charge amplifier that is electronically coupled to said sensor; and a microelectronic device that is electronically coupled to said charge amplifier; wherein said sensor comprises:
   first and second electrodes;
   a first insulator having first and second surfaces;
   a pressure component engaging at leant said first surface of said first insulator, wherein said second surface of said first insulator engages said first electrode, and said pressure component is coupled to said second electrode;
   a second insulator extending substantially perpendicular from said second electrode; and
   a piezoelectric film separating said first and said second electrode, wherein said piezoelectric film is deposited using chemical vapor deposition, wherein said piezoelectric sensor is operable up to a temperature of about 1200° C.

15. A sensor suitable for use in a control circuit as claimed in claim 14, wherein said control circuit provides a measurement selected from the group consisting of pressure, force, and acceleration.

16. A high temperature piezoelectric sensor suited for measuring force comprising:
   a first electrode having a first side and a second side;
   a piezoelectric aluminum nitride film provided to said second aids of said first electrode;
   a second electrode having a first side and a second side, wherein said piezoelectric aluminum nitride film is coupled to said second side of said second electrode;
   an insulating plate provided to said first side of said first electrode;
   an insulator provided to said second side of said second electrode said insulator protrudes from said second electrode in a manner that cause said insulator to fit perpendicularly against said first electrode and said piezoelectric aluminum nitride film;
   a top pressure plate coupled to said insulating plate, said top pressure plate expands over said insulating plate and slidably mounts between said insulator and said second electrode;
   a connector,
   a first wire connecting said first electrode to said connector, and
   a jumper wire connecting said second electrode to said pressure plate.

* * * * *

UNITED STATES PATENT AND TRADEMARK OFFICE
CERTIFICATE OF CORRECTION

PATENT NO.     : 6,617,764 B2
DATED          : September 9, 2003
INVENTOR(S)    : Sebastian et al.

It is certified that error appears in the above-identified patent and that said Letters Patent is hereby corrected as shown below:

Column 6,
Line 36, reads "comprising" should read -- comprising: --
Line 63, reads "electrode, is" should read -- electrode is --
Line 64, reads "carbide and" should read -- carbide, and --
Line 67, reads "force, pressure and" should read -- force, pressure, and --

Column 7,
Line 8, reads "member ii" should read -- member is --
Line 20, reads "film starting" should read -- film separating --
Line 21, reads "electrodes" should read -- electrodes; --

Column 8,
Line 3, reads "engaging at leant" should read -- engaging at least --
Line 24, reads "second aids" should read -- second side --
Line 32, reads "electrode said" should read -- electrode, said --
Line 40, reads "connector," should read -- connector; --
Line 42, reads "connector, and" should read -- connector; and --

Signed and Sealed this

Twenty-second Day of February, 2005

JON W. DUDAS
*Director of the United States Patent and Trademark Office*